United States Patent [19]

Bridger

[11] 4,401,470
[45] Aug. 30, 1983

[54] INTAGLIO PRINTING INK AND METHOD OF EMPLOYING THE SAME

[75] Inventor: Robert F. Bridger, Hopewell, N.J.

[73] Assignee: Mobil Oil Corporation, New York, N.Y.

[21] Appl. No.: 249,050

[22] Filed: Mar. 30, 1981

[51] Int. Cl.³ .............................................. C09D 11/02
[52] U.S. Cl. ........................................ 106/20; 106/23; 106/24; 106/26; 106/30; 260/DIG. 38; 524/258; 524/349
[58] Field of Search ...................... 106/26, 30, 20, 23; 260/45.95 F, 45.9 QB, DIG. 38

[56] References Cited

U.S. PATENT DOCUMENTS

| | | | |
|---|---|---|---|
| 4,021,385 | 5/1977 | Austin et al. | 260/45.9 QB |
| 4,077,727 | 3/1978 | Kramer et al. | 106/30 |
| 4,228,247 | 10/1980 | Moore et al. | 260/45.9 QB |
| 4,304,601 | 10/1981 | Sharp | 106/30 |

Primary Examiner—John Kight, III
Assistant Examiner—Amelia B. Yarbrough
Attorney, Agent, or Firm—Alexander J. McKillop; Michael G. Gilman; Charles J. Speciale

[57] ABSTRACT

An intaglio ink composition and method of using the same for printing by the intaglio process are disclosed. The composition comprises a pigment, a vehicle composed basically of a resin and solvent, and a small amount, e.g., 0.005 to 0.5 wt.%, of an antioxidant composition consisting of a mixture of phenolic and amine antioxidants. The antioxidant composition serves to reduce the tendency of gravure ink formulations to streak during the printing process. A preferred gravure ink formulation contains a small amount of an antioxidant composition consisting of a mixture of 2,6-di-tert-butyl-4-methylphenol and 4,4'-bis(1,1,3,3-tetramethylbutylphenyl)amine.

8 Claims, No Drawings

INTAGLIO PRINTING INK AND METHOD OF EMPLOYING THE SAME

CROSS REFERENCE TO RELATED APPLICATIONS

This application is an improvement over commonly assigned, copending application Ser. No. 238,284 filed Feb. 3, 1981, by V. J. Frilette, entitled Intaglio Printing Ink and Method of Employing Same.

BACKGROUND OF THE INVENTION

Printing inks and printing methods may be broadly divided into three major classes which vary considerably in ink composition, method of application, and drying mechanism. Typographic printing is a method of printing from raised characters or plates which are first inked and then pressed against the surface to be printed, thus transferring the ink. The ink must have sufficient viscosity (tack) and adhesion so that it can be evenly distributed on the rollers of the press and be transferred properly from the type or printing plate to the paper or other substrate being printed. The second major method of printing is lithography which is also known as planographic printing since the process prints from plane surfaces and depends on the fact that grease and water are mutually repellent. If a design is drawn with a greasy substance on a finely-grained metal surface which retains moisture, the lithographic ink will adhere to the design and not the remainder of the plate. In the form of offset lithography, the greasy image is formed on a thin grained metal plate by photographic means and the metal plate is curved and clamped around the plate cylinder of an offset press. Lithographic or offset inks are more viscous than typographic inks and must be substantially resistant to emulsification due to the high speeds developed by offset presses and the resulting high rates of shear. Additionally, the presence of large amounts of volatile solvents in the ink vehicle is undesirable since the solvent will tend to dissolve away the greasy image and cause the plate to go blind. Evaporation of the solvent further gives rise to increased viscosity of the ink which in turn affects the fidelity of printing.

The present invention is concerned with the third major method of printing, i.e., printing by the intaglio process in which, in all forms of intaglio printing, the design to the printed is etched or engraved below the surface plane of the printing plate. The surface of the plate is then covered with ink to fill in the line or pockets of the etching or engraving and the ink is thereafter wiped so as to not disturb the ink in the etching or engraving. Printing is accomplished by pressing the paper firmly against the plate to transfer the ink from the engraving to the paper. One form of the intaglio process is the rotogravure process used to print catalogs, magazines and supplements to the Sunday newspaper, etc. Another form is the engraved steel plate process used in machine printing of currency. The ink formulation employed for intaglio printing will depend upon the type of plate employed and the speed of operation. The printing of currency from an engraved flat steel or copper plate requires inks that are greaseless, possess short consistencies and dry by oxidation. Furthermore since the paper employed is usually dampened, the inks must not bleed or run in water. In rotogravure intaglio inks which are used to print at high speeds from photoelectrically engraved copper or chromium faced rolls, the wiping of the plate is achieved mechanically by means of a doctor blade. Drying of rotogravure inks is accomplished both by evaporation of the solvent and by penetration of the ink when the substrate is paper. These inks are thin and contain pigments of low specific gravity which are suspended in a vehicle composed mainly of a resin and solvent.

In the development of printing inks, particularly gravure or solvent inks, printing qualities such as color reproduction, retention of color tone, pigment wetting, and the like, have received special attention. Since gravure inks employ large amounts of volatile solvents for their application, special attention has been directed to avoiding the danger of explosion and environmental pollution due to extremely toxic vapors. In addition, gravure inks must be substantially free of particles that might become trapped between the doctor blade and the printing roll and cause continuous streaks to appear. Streaking due to this cause is not uncommon and may be largely corrected by filtering the ink to remove such particles before they become trapped, or by running a pointed bamboo stick under the doctor blade to dislodge the stuck particle. In some instances, however, streaking occurs which is not correctable by simple measures. In at least some instances such streaking appears to be associated with a very thin adherent deposit on the part of the printing roll that is not etched. In the past, unsuccessful efforts to eliminate streaking have included filtering ink, changing ink batches, changing ink viscosities, changing ink suppliers, changing solvent blends, changing ink temperature and repeatedly cleaning up the ink unit. Other efforts include scrubbing, de-chroming and re-chroming the cylinder against which the ink rollers press, changing paper and drying temperatures, changing ink formulation and varying the ink formulation from no wax to a high wax ink content. Even the removal of deposits that jam behind the doctor blade, changing the pressure and angle of the doctor blade and changing doctor blade material have not satisfactorily eliminated the problem of streaking.

SUMMARY OF THE INVENTION

The present invention resides in the discovery that a small amount of an antioxidant composition consisting of a mixture of phenolic and amine antioxidants can be added to gravure inks to substantially reduce or eliminate the tendency of such inks to cause streaking when employed for printing by the intaglio process. The amount of antioxidant composition used ranges from 0.005 to 0.5 weight percent and is preferably 0.025 to 0.5 weight percent based on the weight of the total composition.

DESCRIPTION OF THE PREFERRED EMBODIMENTS

Gravure ink compositions are well known and generally comprise a pigment dissolved in an ink vehicle composed of a resin and volatile solvent. The selection of resins for rotogravure inks depends on the solvent and the substrate to be printed and the end use of the printed matter. Detailed examples of over 300 resins used in the manufacture of inks, including gravure types, are set forth in "Synthetic Resins" by Werner Husen, The American Ink Maker, June 1952, page 63. Useful resins include rosin and modified rosins, such as calcium and zinc resinates and variants of these. See also "Synthetic Resins for Inks," John P. Petrone, The American Ink Maker, Vol. 49, March–October, 1971. Both of these articles are incorporated herein by reference.

Other resins other than those mentioned above which can be employed are petroleum resins or various modified products of cyclopentadiene resins, examples of which are found in U.S. Pat. No. 3,084,147 and British No. 1,369,370. These disclosures are also incorporated by reference. Still another modified resin suitable for use in gravure inks is the resin which is prepared by collecting a fraction boiling at 140°–220° C. from a cracking oil which is obtained by thermal cracking of petroleum, polymerizing the fraction using a Friedel-Craft catalyst to give a resin having a softening point of 160° C., reacting the resin with an unsaturated carboxylic acid or its anhydride in an amount of 0-01 to 0-4 mole per 100 gram of the resin, and then esterifying the resulting resin using a monovalent alcohol in the amount of 0-2 to 2-0 moles per mole of the above unsaturated carboxylic acid or anhydride, to give a resin having a softening point of 145° C. The product has a stable viscosity and induces excellent printing. See Japanese Pat. No. 47,994/72.

The resin employed in the gravure ink is used in a vehicle whose solvent constituent may be an aliphatic or an alicyclic hydrocarbon such as hexane, heptane and cyclohexane. The resin also may be used in aromatic hydrocarbon solvents such as xylene, toluene (e.g., tolusol 25), high flash naphtha, benzene and chlorobenzene. Other solvents include $C_1$ to $C_4$ alcohols, the acetates of $C_1$ to $C_5$ alcohols, glycol ethers boiling from about 115° to 180° C., and $C_1$ to $C_5$ aliphatic ketones and cyclohexanone. The resin must be soluble in the solvent and readily separated therefrom. Since the drying of gravure inks results from evaporation of the solvent, the ink vehicle is basically a resin and solvent. Depending upon the particular combination of resin and solvent various types of vehicles can be used.

The characteristics of various resins and solvents used in gravure inks are set forth below using the common letter designations employed by the printing trade.

TABLE I

| GRAVURE INK CLASSES | | | |
|---|---|---|---|
| Type | Resin Used | Solvents Used | Applications |
| A | metallated resin, gilsonite, & other hydrocarbon solvent resins | low-cost aliphatic hydrocarbons such as hexane, textile spirits, lactol spirits, VM&P, naphtha, mineral spirits | newspaper supplement, catalog preprint, & similar publication printing |
| B | ethylcellulose plus other modifying resins | 50% aromatic hydrocarbon solvent 50% aliphatic hydrocarbon solvent | same as above except designed for better performance on coated stock |
| C | nitrocellulose modified with resins & plasticizers | esters, ketones extended with aromatic hydrocarbon solvent diluents such as toluene, xylene | for printing on all papers, films, foils, & paperboard including nitrocellulose-coated cellophane, glassine, acetate, metallized paper, etc. |
| D | polyamides | usually a 50/50 alcohol & aliphatic or aromatic hydrocarbon solvent | printing on foil, paper, boards, polymer-coated cellophane, polyethylene, polyester, & other specialty films. Also for hard, tough, glossy, overlacquer applications |
| E | nitrocellulose or ethylcellulose plus alcohol-soluble resin modifiers & plasticizers | ethanol or other alcohols plus ester solvents such as ethyl acetate | dye inks & pigmented inks for stocks described under type C |
| T | chlorinated rubber plus other modifying resins & plasticizers | usually aromatic hydrocarbon solvent such as toluene or xylene | for nitrocellulose-coated cellophane, foil, paper & board for labels, wrappers & cartons; also glossy overlacquers |
| W | natural or synthetic resins such as shellac, casein, maleated resins, etc. | water plus alcohols when required, | for absorbent stocks such as liner board, wallpaper, gift wrap, laminating inks, board to be waxed, etc/ |
| X | any other non-recognized type | alkali used also for solubiliza- | all other miscellaneous applications |

TABLE I-continued

GRAVURE INK CLASSES

| Type | Resin Used required | Solvents Used tion of binder | Applications |
|---|---|---|---|

The antioxidant compositions used in the ink consist of a mixture of phenolic and amine antioxidants which are known in the art. Generally, the antioxidant composition will contain about 10 to 90 wt. percent, preferably about 25 to 75 wt. percent, of the phenolic antioxidant and about 90 to 10 wt. percent, preferably 75 to 25 wt. percent, of the amine antioxidant.

Suitable amine antioxidants may include, among others, octylated diphenylamine, isopropoxy diphenylamine, aldol alpha-naphthylamine condensation product of diphenylamine and acetone, N,N'-diphenyl-p-phenylenediamine, phenyl-βnaphthylamine, polymerized 1,2-dihydro-2,2,4-trimethyl quinoline, N,N'-di(2-octyl)-p-phenylenediamine, other aromatic amines, diphenylamines, and mixtures thereof. The phenolic antioxidants which are used in the antioxidant composition include 4,4'-isopropylidene diphenol, styrenated phenol, hindered phenol, 4,4'-thiobis (6-t-butyl-o-cresol), p-butylphenol, p-isopropylphenol, 2,4-dimethyl-6-octyl phenol, 2,6-ditertiarybutyl-4-methyl phenol, 2,6-ditertiarybutyl-4-ethyl phenol, 2,6-ditertiarybutyl-4-n-butyl phenol, 2,2'-methylenebis (4-methyl-6-tertiarybutyl phenol), 2,2'-methylenebis (4-ethyl-6-tertiarybutyl-phenol), 2,4-dimethyl-6-tertiarybutyl phenol, 4-hydroxymethyl-2,6-ditertiarybutyl phenol, n-octadecyl-beta (3,5-ditertiarybutyl-4-hydroxyphenyl) propionate, mixtures thereof and the like. The sterically hindered phenolic antioxidants are the preferred class of phenolic compounds.

An effective amount of antioxidant for use in the ink composition is to some extent dependent on the choice of antioxidant composition, the nature of the ink composition, including particular pigment used, and the environmental conditions under which the ink will be stored or exposed in actual use. In general the antioxidant will be used in an amount ranging from about 0.005 to 0.5 weight percent, preferably 0.025 to 0.25 weight percent, based on the ink. A particularly preferred range is 0.05 to 0.15 weight percent.

The intaglio printing inks are prepared in a customary manner with the exception of using the aforementioned antioxidant composition as an essential component of the vehicle. For example, 100 parts by weight of the resin and 1 part of antioxidant composition are dissolved in up to 200 parts by weight of a high boiling petroleum solvent such as a mixture containing 70 weight percent toluene, 4 weight percent xylene and 26 weight percent lactol spirits to prepare the vehicle. Particularly preferred solvents such as this mixture have a Kauri butanol value of about 105 as compared to aliphatic solvents which have a Kauri butanol value of 35-45. A pigment such as Phthalocyanine Blue, Benzidine Yellow, channel black, Carmine 6B or titanium white is added and the mixture is placed in a ball mill and ground until a uniform dispersion of the pigment in the hydrocarbon solution is obtained. In this manner it is possible to prepare an ink concentrate which may be subsequently diluted with additional solvent, thus making it appropriate for use in the printing operation. Typically, for instance, an ink composition used in a gravure printing operation may contain between about 0.005-0.5% of the antioxidant composition 10% and about 50% of the resin, between about 50 to 100 parts of pigment or colorant per 100 parts of resin, the balance consisting essentially of a mixture of hydrocarbon solvents such as toluene, xylene and lactol spirits. The viscosity of the ink at the point of use is not more than 5 poises and is preferably between 0.5 and 1.0 poises.

It should be understood that other additives can be added to the printing ink for improvement of printability, flow behavior, and pigment wetting, for example, in amounts from 1-15 percent by weight (preferably 1-10 percent by weight), calculated on the resin. Waxes, such as ester waxes, amide waxes, hydrocarbon waxes, can be added in amounts from 0.1-5 percent by weight. Other known additives such as ethyl cellulose or ethyl hydroxy cellulose may be used to promote ink film adhesion, scuff resistance, gloss, etc., providing the additive is compatible with the gravure resin. The printing inks are preferably used without plasticizers, although the latter can be added to achieve special effects.

As substrates, the printable print carriers conventionally used in intaglio printing can be used, such as paper, cellophane, as well as metal films such as aluminum film.

The following examples illustrate the best mode now contemplated for carrying out the invention.

EXAMPLES 1-7

Autoxidation rates were measured at 60° C. as described by R. F. Bridger, A. L. Williams, and L. J. McCabe, Industrial and Engineering Chemistry, Product Research and Development, Volume 5, Page 226, September 1966.

Autoxidations at 60° C. were conducted in a cylindrical cell of 50 ml capacity, surrounded by a 60° C. water bath. The contents (10 ml) of the reaction cell were agitated with a magnetic stirrer. Reaction rates were independent of oxygen pressure to 300 mm of Hg total pressure and were unaffected by the rate of stirring in the range of 500 to 1600 rpm. Oxygen consumption was measured at constant pressure by manually adjusting the mercury manometer and reading the change in volume from a 10 ml buret surrounded by a 25° C. water bath. Connecting portions of the apparatus were made of 2 mm id capillary tubing. Rates were expressed as moles of oxygen absorbed per liter of solution per sec, $M\ s^{-1}$.

The gravure ink was a commercial blue ink, consisting of 47% hydrocarbon solvent and 53% solids, of which 43% was resin and 57% was pigment., believed to be copper phthalocyanine. In the examples shown below, the volume of reactant was 10 ml. In Example 2, the resin (2.3 g) was separated from 10 ml of a solvent solution of resin by rotary evaporation and redissolved in chlorobenzene for the oxidation measurement. In order to minimize errors during measurements of inhibited rates, the ink was oxidized for ca. 6000 seconds without antioxidant, and then the antioxidant was injected via a 100 μL syringe into the reaction medium. The inhibited oxidation rate was taken from the slope of oxygen absorption vs. time after the injection of antioxidant.

As shown below, the data in Table I demonstrates that the rate of oxidation of a commercial blue rotogravure ink that contains a resin, solvent and Pthalocyanine Blue pigment is substantially reduced by incorporation of the antioxidant composition in the ink.

TABLE 1

| Example | Composition | Oxidation Rate × $10^6$ M s$^{-1}$ | Percent Reduction in Oxidation Rate |
|---|---|---|---|
| 1 | Solvent only | 0 | — |
| 2 | Resin equivalent of 10 ml ink, dissolved in chlorobenzene | 0.19 | — |
| 3 | Blue ink | 1.00 | — |
| 4 | Blue ink | 0.97 | — |
| 5 | Blue ink | 0.99 | — |
|  | Average of Examples 3, 4, and 5 (standard deviation 0.015) | 0.987 | — |
| 6 | 1000 ppm DBPC in blue ink | 0.26 | 74 |
| 7 | 1000 ppm DTOA in blue ink | 0.62 | 37 |
| 8 | 500 ppm DBPC plus 500 ppm DTOA in blue ink | 0.15 | 85 |

The inhibitors employed in Table I were 2,6-di-tert-butyl-4-methylphenol, abbreviated DBPC (Example 6) and 4,4'-bis(1,1,3,3-tetramethylbutylphenyl)amine, abbreviated DTOA (Example 7).

What is claimed is:

1. In an intaglio printing ink composition which dries by evaporation of solvent comprising a resin, pigment and volatile solvent, the improvement which comprises adding to said composition a small amount of antioxidant composition consisting of a phenolic and amine antioxidant.

2. The composition of claim 1 wherein the amount of antioxidant composition is 0.005 to 0.5 weight percent.

3. The composition of claim 1 wherein the amount of antioxidant composition is 0.025 to 0.1 weight percent.

4. The composition of claims 1, 2, or 3 wherein the antioxidant composition consists of 2,6-ditertiary butyl-4-methyl phenol and octylated diphenylamine.

5. In a process for printing surfaces by an intaglio printing process using an ink composition which dries by evaporation of solvent comprising a resin, pigment and volatile solvent, the improvement of using an ink which contains a small amount of an antioxidant composition consisting of a phenolic and amine antioxidant.

6. The process of claim 5 wherein the amount of antioxidant composition is 0.005 to 0.5 weight percent.

7. The process of claim 5 wherein the amount of antioxidant composition is 0.025 to 0.1 weight percent.

8. The process of claims 5, 6 or 7 wherein the antioxidant composition consists of 2,6 ditertiary butyl-4-methyl phenol and octylated diphenylamine.

* * * * *